United States Patent [19]

Hofmann et al.

[11] 4,102,870

[45] Jul. 25, 1978

[54] MODIFIED POLYURETHANES WITH INCREASED LIGHT STABILITY

[75] Inventors: Peter Hofmann, Basel; Helmut Müller, Binningen; Jean Rody, Basel, all of Switzerland

[73] Assignee: Ciba-Geigy Corporation, Ardsley, N.Y.

[21] Appl. No.: 793,707

[22] Filed: May 4, 1977

[30] Foreign Application Priority Data

May 11, 1976 [CH] Switzerland .................. 5891/76

[51] Int. Cl.² ............................................ C08G 18/38
[52] U.S. Cl. ...................................... 528/73; 528/65; 528/66
[58] Field of Search ............. 260/77.5 AM, 77.5 AQ, 260/75 NH, 75 NQ, 2.5 AM, 2.5 AQ, 77.5 SS

[56] References Cited

U.S. PATENT DOCUMENTS

| | | | |
|---|---|---|---|
| 3,383,365 | 5/1968 | Tate et al. ....................... | 260/75 NH |
| 3,640,928 | 2/1972 | Murayama et al. ............. | 260/23 XA |
| 3,684,765 | 8/1972 | Matsui et al. ................... | 260/45.8 N |
| 3,705,126 | 12/1972 | Matsui et al. ................... | 260/45.8 N |
| 3,790,525 | 2/1974 | Murayama et al. ......... | 260/45.8 NZ |
| 3,840,494 | 10/1974 | Murayama et al. ............. | 260/45.8 N |
| 3,850,877 | 11/1974 | Cook ................................. | 260/45.8 N |
| 3,859,293 | 1/1975 | Murayama et al. ............. | 260/45.8 A |
| 3,904,581 | 9/1975 | Murayama et al. ............. | 260/45.8 N |
| 3,929,804 | 12/1975 | Cook ................................. | 260/45.8 N |
| 3,939,168 | 2/1976 | Cook ................................. | 260/45.8 N |
| 3,940,363 | 2/1976 | Murayama et al. ............. | 260/45.8 N |
| 3,941,744 | 3/1976 | Murayama et al. ............. | 260/45.8 N |
| 4,021,432 | 5/1977 | Holt et al. ........................ | 260/45.8 N |

FOREIGN PATENT DOCUMENTS

| | | | |
|---|---|---|---|
| 2,611,208 | 10/1976 | Fed. Rep. of Germany ... | 260/45.8 N |
| 1,393,616 | 5/1975 | United Kingdom .......... | 260/45.8 N |

*Primary Examiner*—M. J. Welsh
*Attorney, Agent, or Firm*—Vincent J. Cavalieri

[57] ABSTRACT

The incorporation of sterically hindered piperidine derivatives into polyurethanes protects this polymer material against light degradation. Usable for the incorporation are piperidine derivatives which are at least difunctional towards isocyanates and contain the structure

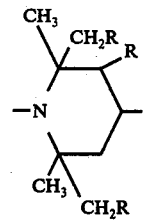

wherein R is hydrogen or alkyl having 1 to 5 carbon atoms.

9 Claims, No Drawings

MODIFIED POLYURETHANES WITH INCREASED LIGHT STABILITY

The invention relates to modified polyurethanes, preferably polyurethane elastomers, which are stabilised against the action of light by incorporating functional derivatives of sterically hindered polyalkylpiperidines.

Sterically hindered piperidines are effective as stabilisers for light-sensitive organic materials and are, above all, used as light-stabilising additives for plastics. Examples of these piperidines are the ethers, esters and carbamates of 4-hydroxy-2,2,6,6-tetraalkylpiperidines, such as are described in DT-OS 1,929,928 and 2,258,752, the derivatives of 4-amino-2,2,6,6-tetraalkylpiperidines, such as are described in DT-OS 2,040,975 and 2,349,962, or the derivatives of 2,2,6,6-tetraalkylpiperidine-4-acetic acids, such as are described in DT-OS 2,337,847, 2,337,796 and 2,337,865.

Like other plastics additives, light stabilisers of this type, which are based on sterically hindered piperidine derivatives, are extractable and, in the case of relatively low molecular weight, also volatile, which, depending on the processing temperature, is of great importance. The migration of the stabilising additives also is a major problem.

It has been found that it is possible to modify polyurethanes, by incorporating sterically hindered piperidine derivatives, in such a way that they contain, in the polymer molecule, the grouping

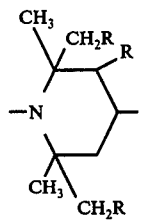

in which R denotes hydrogen or alkyl with 1-5 C atoms.

The substantially better light stability of the polyurethanes thus modified is not lost as a result of extraction losses, migration losses or evaporation losses.

Above all, the invention relates to the modification of polyurethanes such as are used on a large scale in industry for the manufacture of foams, elastic fibres, thermoplastics, coatings or lacquers. Polyurethanes of this type are manufactured from several components by the polyaddition process. For this there is selected, for example, a diol component which consists of aliphatic compounds with relatively long chains and which forms the so-called flexible segment in the polymer. Polyethers and polyesters having hydroxyl end groups and molecular weights from about 500 to 5,000 are predominantly used for the purpose. These polyethers and polyesters are reacted with the isocyanate component, for example diphenylmethane 4,4'-diisocyanate, 4,4'-diisocyanatodiphenyl ether or naphthalene-1,5-diisocyanate. The isocyanate component is reacted with the polyol in such a molar ratio that prepolymers with isocyanate end groups are formed. These prepolymers are then reacted with the third component, that is to say the so-called chain lengthener. These are difunctional low-molecular compounds, for example hydrazine, diamines, aminoalcohols, glycols and the like. The latter form, together with the isocyanate component, the so-called rigid segment which, due to its urea groups or carbamate groups, can form hydrogen bridges which effect a physical crosslinking of the polyurethanes. However, it is also possible to achieve a chemical crosslinking by using polyols, isocyanates or chain lengtheners, which possess a functionality higher than 2 and, preferably, are trifunctional or tetrafunctional.

Provided the chain lengtheners carry amino groups, urea groups are also formed in the reaction with the isocyanate groups. Nevertheless, such products are also called polyurethanes.

The formation of the polyurethanes from the components mentioned can take place by simultaneous or successive reaction of the three components. In order to obtain products with the most diverse properties, the processes and the components for the formation of polyurethane can be varied in diverse ways which need not be explained herein greater detail and are known to those skilled in the art.

The modification, according to the invention, of the polyurethanes is effected by additionally using a derivative, which reacts with isocyanates, of a sterically hindered piperidine. In particular, the modification is effected by additionally using, in the manufacture of polyurethanes, those sterically hindered piperidine derivatives which are at least difunctional in the reaction with isocyanates. Compounds which are suitable for this purpose are, above all, those of the following formulae I to XI

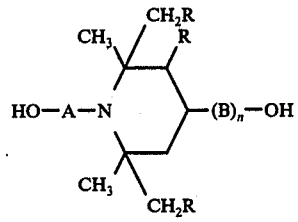

I

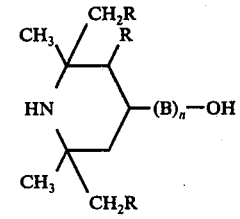

II

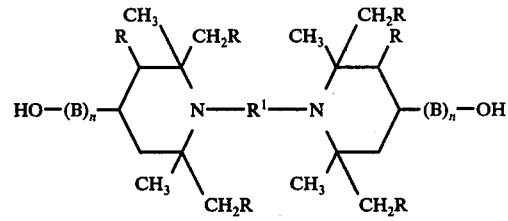

III

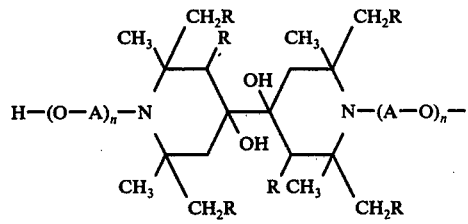

IV

-continued

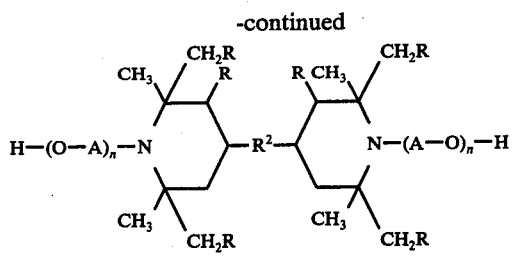  V

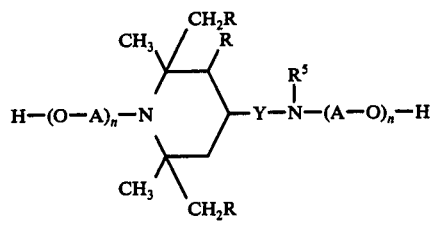  VI

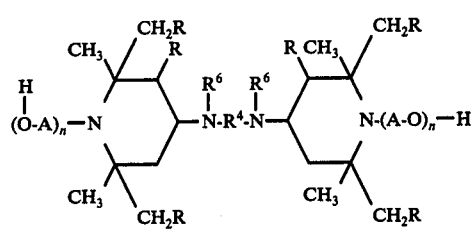  VII

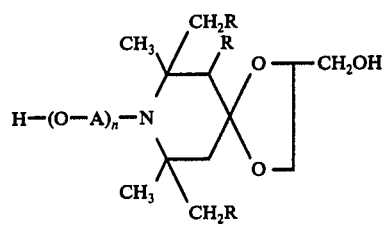  VIII

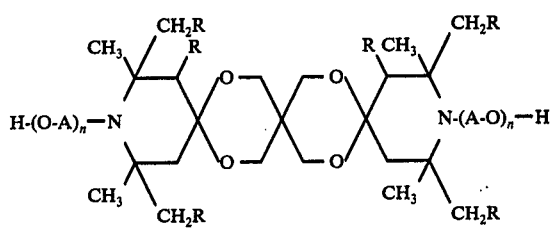  IX

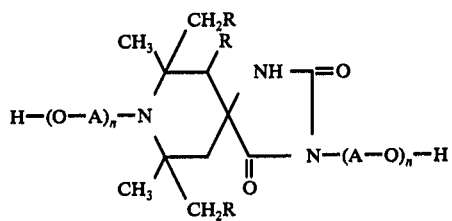  X

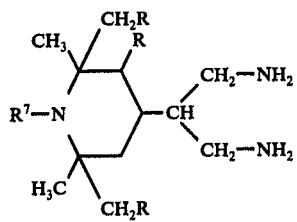  XI

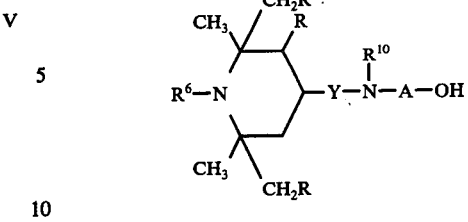  XII

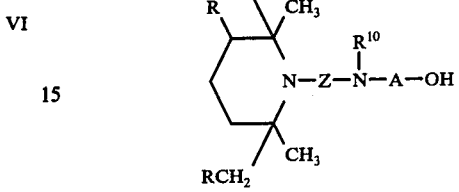  XIII in which A denotes a group —CH$_2$—CH$_2$—, —CH$_2$—CH(CH$_3$)—or —CH$_2$—CH(C$_6$H$_5$)—, B denotes a group —CH$_2$—CH$_2$—and n denotes zero or 1, Y denotes a direct bond, —CH$_2$CH$_2$—or OCH$_2$CH$_2$CH$_2$—, preferably a direct bond, Z denotes a group —CH$_2$CH$_2$CH$_2$—or —CH$_2$CH$_2$OCH$_2$CH$_2$CH$_2$—, R denotes hydrogen or alkyl with 1 to 5 C atoms, preferably hydrogen or methyl, R$^1$ denotes alkylene with 4 to 10 C atoms, alkenylene with 4 to 8 C atoms, p-xylylene or

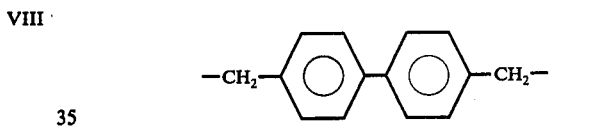

and R$_2$ denotes alkylene with 4–10 C atoms, xylylene,

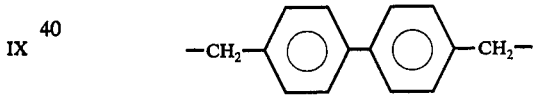

or one of the groups —NR$^5$—CO—NR$^5$—, NR$^5$—CO—CO—NR$^5$—, NR$^5$—CO—R$^3$—CO—NR$^5$—, -O-alkylene-O- with 1–10 C atoms, -O-alkylene-O- with 4–8 C atoms, —O—xylylene—O—,

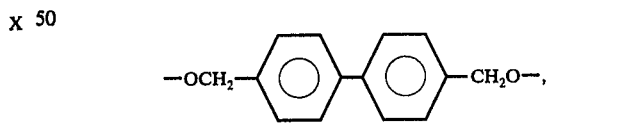

—O(CH$_2$)$_2$NHCONH(CH$_2$)$_3$O—, —O(CH$_2$)$_3$NHCOCONH(CH$_2$)$_3$O—, —O(CH$_2$)$_3$NHCO—R$^3$—CONH(CH$_2$)$_3$O—, —CH$_2$CH$_2$NHCONHCH$_2$CH$_2$—, —CH$_2$CH$_2$NHCOCONHCH$_2$CH$_2$—, —CH$_2$CH$_2$NHCO-R$^3$—CONHCH$_2$CH$_2$—or —O—CO—R$^3$—CO—O—, and R$^3$ denotes alkylene with 1 to 10 atoms, phenylene or one of the groups

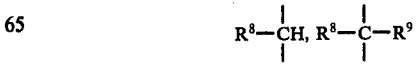

or NH—R⁴—NH and R⁴ denotes alkylene with 2 to 12 C atoms, arylene with 6 to 12 C atoms or a radical phenylene-X-phenylene in which X represents —CH$_2$—, >C(CH$_3$)$_2$, —O— or —SO$_2$—, R⁵ deontes hydrogen, alkyl with 1 to 12 C atoms, aryl or alkaryl with 6 to 10 C atoms, aralykyl with 7 to 9 C atoms or cyclohexyl, R⁶ denotes hydrogen, alkyl with 1 to 12 C atoms, allyl, benzyl or acyl with 1 to 12 C atoms, R⁷ denotes hydrogen, alkyl with 1 to 12 C atoms, allyl, benzyl or acyl with 2 to 4 C atoms, R⁸ denotes allyl, phenyl, benzyl or hydroxy-dialkylbenzyl with 9–15 C atoms, R⁹ denotes allyl, benzyl or hydroxy-dialkylbenzyl with 9–15 C atoms, and R¹⁰ denotes hydrogen or the group —A—OH.

R therein can denote an alkyl group with 1 to 5 C atoms, such as methyl, propyl or butyl. Preferably, however, R is hydrogen, and this corresponds to the use of derivatives of 2,2,6,6-tetramethylpiperidine.

If R¹ or R² denote alkylene with 4 to 10 C atoms, this can, for example, be tetramethylene, hexamethylene, octamethylene or decamethylene.

If R¹ denotes alkenylene with 4–8 C atoms, it can be, for example, 1,4-but-2-enylene or 2-methyl-1,4-but-2-enylene.

If R³ denotes alkylene with 1 to 10 C atoms, these can be methylene radicals and polymethylene radicals but also branched radicals, such as, for example, 1,1-propylene, 1-butyl-1,2-ethylene or 1,1,3-trimethyl-1,4-butylene.

IF R⁴ denotes alkylene with 2 to 12 C atoms, these can be unbranched or branched alkylene radicals, for example 1,2-ethylene, tetramethylene, hexamethylene, decamethylene, dodecamethylene or 2,2,4-trimethyl-1,6-hexylene. If R⁴ is an arylene radical with 6 to 12 C atoms, this can, for example, be 1,3-phenylene, 1,4-phenylene, 1,4-naphthylene or 4,4'-diphenylene.

In the meaning of alkyl, R⁵, R⁶ and R⁷ can, for example, be methyl, ethyl, butyl, hexyl, 2-ethylhexyl, octyl, decyl or dodecyl.

In the meaning of aryl or arkaryl, R⁵ can, for example, be phenyl, tolyl, 4-isopropylphenyl or naphthyl. In the meaning of aralkyl, R⁵ can, for example, be benzyl, methylbenzyl or phenylethyl.

In the meaning of acyl with 1 to 12C atoms, R⁶ can, for example, be formyl, acetyl, propionyl, butyryl, acryloyl, crotonoyl, hexanoyl, octanoyl, lauroyl, benzoyl or chlorobenzoyl.

In the meaning of acyl with 2 to 4 C atoms, R⁷ can be acetyl, pripionyl, butyryl, acryloyl, methacryloyl or crotonyl.

Preferably, R⁵, R⁶ and R⁷ denote hydrogen or methyl.

In the meaning of hydroxy-dialkylbenzyl, R⁸ and R⁹ can be, in particular, 4-hydroxy-3,5-di-tert.butyl-benzyl.

In the formulae I, II and III, $n$ preferably denotes zero.

Most of these compounds are known as light stabilisers or can be obtained from known compounds by simple chemical reactions.

Thus, for example, the compounds of the formula II, in which $n$ is zero, are obtained by reducing the corresponding 4-oxopiperidines. Compounds of the formula II, in which $n$ is one, are described in DT-OS 2,402,636.

Compounds of the formula I are obtained by reacting the compounds of the formula II with ethylene oxide, propylene oxide or styrene oxide. The compounds of the formula IV with $n$ = zero are described in Japanese Patent No. 640,258, those of the formula V are described in Japanese Patent No. 659,579 and DT-OS 2,040,975, 1,929,928 and 2,204,659, those of the formulae VIII and IX are described in DT-OS 2,353,538 and those of the formula X are described in DT-OS 2,030,908. Reaction of these compounds with ethylene oxide, propylene oxide or styrene oxide gives the corresponding compounds of the formulae IV, V, VIII, IX and X with $n$ = one. The compounds of the formula VI are described in DT-OS 2,040,975 and DT-OS 2,352,379. Compounds of the formula VII in which R⁶ is hydrogen can be prepared by hydrogenating 4-oxopiperidines in the presence of diamines H$_2$N—R⁴—NH$_2$. These compounds can subsequently be alkylated, benzylated, allylated or acylated on the nitrogen in the 4-position and hydroxylalkylated on the nitrogen in the 1-position.

Compound of the formula XI can be prepared by hydrogenating the corresponding 4-dicyanomethylidene-piperidines. The compounds of the formulae XII and XIII can be prepared by hydroxyalkylating the corresponding primary amines.

Examples of individual compounds of the formula I are : 1-(2-hydroxyethyl)-2,2,6,6-tetramethyl-4-hydroxypiperidine, 1-(2-hydroxypropyl)-2,2,6,6-tetramethyl-4-hydroxypiperidine, 1-(2-phenyl-2-hydroxyethyl)-2,2,6,6-tetramethyl-4-hydroxypiperidine, 1-(2-hydroxyethyl)-2,2,6,6-tetramethyl-4-(2-hydroxyethyl)-piperidine, 1-(2-hydroxyethyl)-2,3,6-trimethyl-2,6-diethyl-4-hydroxypiperidine and 1-(2-hydroxyethyl)-2,3,6-trimethyl-2,6-diethyl-4-(2-hydroxyethyl)-piperidine.

Examples of compounds of the formula II are: 4-hydroxy2,2,6,6-tetramethylpiperidine, 4-(2-hydroxyethyl)-2,2,6,6-tetramethylpiperidine, 4-(2-hydroxyethyl)-2,3,6-trimethyl-2,6-diethylpiperidine and 4-hydroxy-2,3,6-trimethyl-2,6-diethylpiperidine.

Examples of compounds of the formula III are; 1,6-bis-(4-hydroxy-2,2,6,6-tetramethypiperidinyl-1)-hexane, 1,8-bis8(4-hydroxy-2,3,6-trimethyl-2,6-diethylpiperidinyl-1)-octane and α, α'-bis (4-hydroxy-2,2,6,6-tetramethylpiperidinyl-1)-p-xylene.

Examples of compounds of the formula IV are: 4,4'-dihydroxy-2,2,2',2'6,6',6'-octamethyl-4,4'-dipiperidyl, 1,1'-di-(2-hydroxyethyl)-4,4'-dihydroxy-2,2,2'2'6,6',6'-octamethyl-4,4'-dipiperidyl, 1,1'-di-(2-hydroxypropyl)-4,4'-dihydroxy-2,2,2',2',6,6',6'-octamethyl-4,4'-dipiperidyl and 1,1'-di-(2-hydroxy-2-phenylethyl)-4,4'-dihydroxy-2,2,2',2', 6,6', 6'-octamethyl-4,4'-dipiperidyl.

Examples of compounds of the formula V are: 1,3-bis-[1-(2-hydroxyethyl)-2,2,6,6-tetramethylpiperidinyl4]-urea, bis-[1-(2-hydroxypropyl)-2,2,6,6-tetramethylpiperidinyl-4]sebacate, bis-[1-(2-hydroxyethyl)-2,3,6-trimethyl-2,6-diethyl-piperdinyl-4] adipate and bis-[1(2-hydroxyethyl)-2,2,6,6-tetramethylpiperidinyl-4]-adipamide.

Examples of compounds of the formula VI are: 2,2,6,6-tetramethyl-;b 4-aminopiperidine, 2,3,6-trimethyl-2,6-diethyl-4-aminopiperidine, 2,2,6,6-tetramethyl-4-butylaminopiperidine, 1-(2-hydroxyethyl)-2,2,6,6-tetramethyl-4-methylaminopiperidine and 1-(2-hydroxypropyl)-2,2,6,6-tetramethyl-4-aminopiperdine.

Examples of compounds of the formula VII are the compounds of the following formulae:

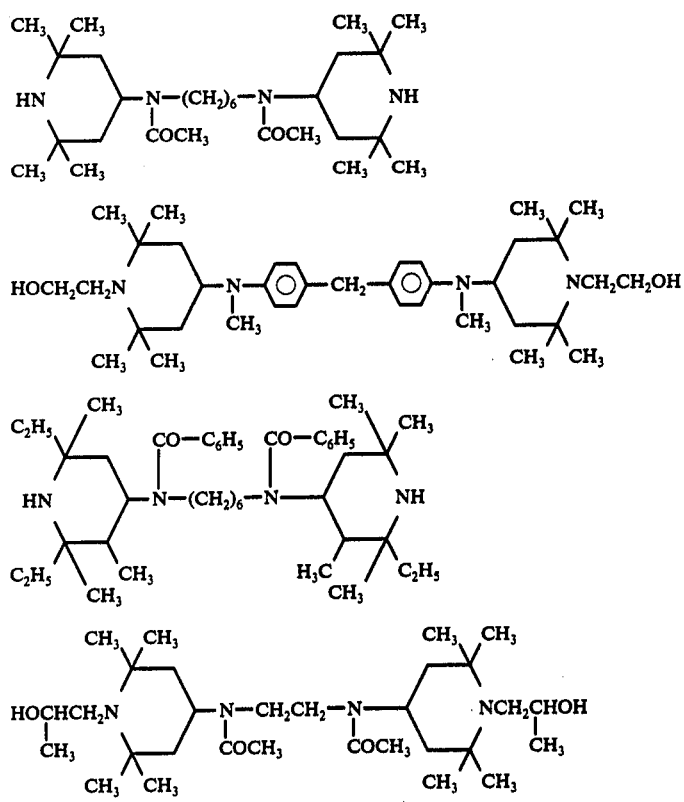

Examples of compounds of the formula VIII are:

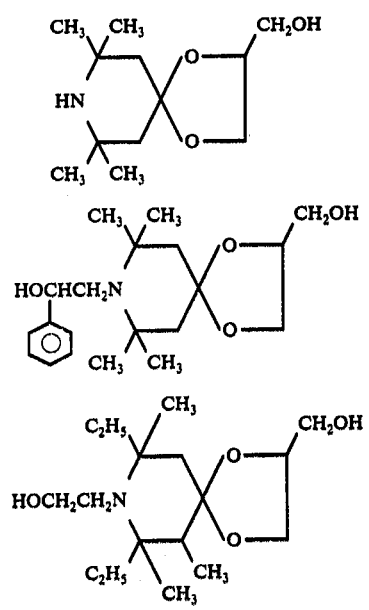

Examples of compounds of the formula IX are:

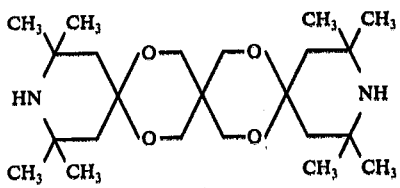

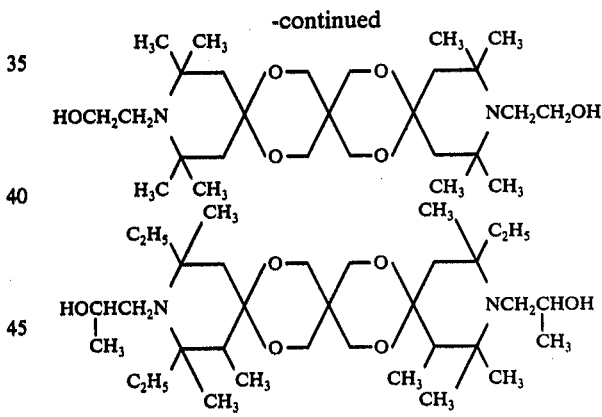

Examples of compounds of the formula X are: 1,3,8-triaza-7,7,9,9-tetramethyl-3-(2-hydroxyethyl)-spiro[4.5]decane-2,4-dione, 3,8-di-(2-hydroxyethyl)-1,3,8-triaza-7,7,9,9-tetramethyl-spiro[4.5]-decane-2,4-dione, 1,3,8-triaza-6,7,9-trimethyl-7,9-diethyl-3-(2-hydroxypropyl)-spiro[4.5]decane-2,4-dione and 3,8-di-(2-hydroxypropyl)-1,3,8-triaza-7,7,9,9-tetramethyl-spiro[4.5]-decane-2,4-dione.

Examples of compounds of the formula XI are: 1,3-diamino-2-(2,2,6,6-tetramethylpiperidinyl-4)-propane, 1,3-diamino-2-(1-acetyl-2,2,6,6-tetramethylpiperidinyl-4)-propane and 1,3-diamino-2-(1-methyl-2,2,6,6-tetramethylpiperidinyl-4)-propane.

Examples of compounds of the formula XII are: 1-methyl-2,2,6,6-tetramethyl-4-diethanolaminopiperidine and 1-allyl-2,2,6,6-tetramethyl-4-[2-(2-hydroxyethylamino)-ethyl]-piperidine.

Examples of compounds of the formula XIII are: 1-[3-(2-hydroxypropylamino)-propyl]-2,2,6,6-tetramethylpiperidine and 1-[(3-diethanolamino)-propyl]-2,3,6-trimethyl-2,6-diethylpiperidine.

According to the invention, these difunctional piperidine derivatives are additionally used in the manufacture of the polyurethanes. In this process, they can be admixed to the polyol component and the latter can then be reacted further with the isocyanate component, as is customary, or the piperidine compound is used as a chain lengthener or is mixed with a piperidine-free chain lengthener. It is also possible to prepare, using the piperidine-containing components in a separate step, a prepolymer which is then reacted further with the piperidine-free components.

The reaction of the components of the alcohol type with the isocyanate is preferably carried out at temperatures between 70° C and 150° C, whilst the reaction of the components of the amine type, in particular of the primary amine type, preferably takes place at lower temperatures, that is to say at 20° C to 50° C. However, the reaction on the sterically hindered nitrogen of the piperidines which are employed according to the invention is preferably carried out in the temperature range of the reaction of the components of the alcohol type. Solvents, such as chlorobenzene, tetrahydrofurane and others can be used in the manufacture of the polyurethanes according to the invention. Provided the temperature does not rise substantially above room temperature, dimethylformamide can also be used in the chain lengthening step.

According to the invention, the polyalkylpiperidine derivatives can also be incorporated in the polyurethanes by using polyester-diols or polyether-diols, which have been modified by polyalkylpiperidine derivatives, as the hydroxyl component. Examples of these diols are polyesters from an aliphatic dicarboxylic acid, an aliphatic diol and a diol of the formulae I, III or V, or polyethers which are formed by polyoxyethylation of the compounds of the formulae II, VI and IX.

The amount which is added of the piperidine-containing component depends on the proportion of the active group therein and on the desired light stabilising effect. In general, such an amount of the piperidine-containing component is used that the proportion of the active group

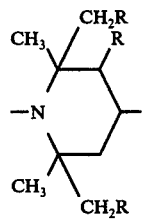

is about 0.01 to 5% by weight of the solvent-free polyurethane.

The polyurethanes which have been modified according to the invention can contain further additives, such as are known and customary in polyurethane technology. These additives are, for example, antioxidants, light stabilisers, co-stabilisers, antistatic agents, flame-proofing agents, blowing agents, thixotropic agents, pigments or fillers. In the case of polyurethane coatings and lacquers, cellulose derivatives may be added, such as cellulose nitrate, cellulose acetate propionate or cellulose acetate butyrate. These additives can either be added already during the manufacture of the polyurethanes, or be added before shaping.

The examples which follow are intended to explain the invention in more detail, without limiting it.

EXAMPLE 1

13.5 g (54 mmols) of diphenylmethane 4,4'-diisocyanate were dissolved in 25 g of tetrahydrofurane and warmed to the reflux temperature. 60 g (30 mmols) of polytetramethylene ether having a molecular weight of 2,000 were dissolved in 100 g of tetrahydrofurane. In order to remove traces of water azeotropically, 85 g of tetrahydrofurane were distilled off. The residual solution was added dropwise in the course of 1 hour to the above solution, and the mixture was kept under reflux for a further hour. 0.628 g (4 mmols) of 2,2,6,6-tetramethyl-4-hydroxypiperidine, dissolved in 5 g of tetrahydrofurane, was then added dropwise, and the mixture was kept under reflux for a further hour and then cooled and diluted with 45 g of dimethylformamide. In the course of 30 minutes, this solution was added dropwise at 25° C, whilst stirring, to a suspension consisting of 0.145 g (1 mmol) of bis-(aminopropyl)-methylamine and 1.14 g (19 mmols) of ethylenediamine in 250 g of dimethylformamide and 4 g of ice-free solid carbon dioxide. The resulting viscous solution was spread, in a thickness of 0.5 mm, onto cleaned aluminium foils, dried in air, dried at 100° C in a drying cabinet and exposed in a Xenotest 1200. A number of samples were extracted for 6 hours with methanol in a Soxhlet apparatus at 57° C, dried and likewise exposed for varying periods of time. The polyurethane films were stripped off the aluminium foils and the stress-strain diagram of unexposed and exposed samples of 6 mm width and 25 mm length was determined.

Damage caused by light manifests itself by an embrittlement of the films and by a fall in the elongation at break and the tensile strength. The change in these properties during exposure is thus a good measure of the damage by light, which has occurred.

For comparison, a polyurethane was prepared as described above, except that only 12.5 g of diphenylmethane diisocyanate were employed instead of 13.5 g and the 2,2,6,6-tetramethyl-4-hydroxypiperidine was omitted.

This stabiliser-free polyurethane was spread as such to give films (comparison sample A), whilst 2 mmols (0.960 g) of bis-(2,2,6,6-tetramethylpiperidin-4-yl) sebacate were added, before spreading, to a similarly prepared sample (comparison sample B). These comparison samples were also exposed before and after an extraction lasting 6 hours. The measured values obtained are summarised in Tables 1 and 1a.

Table 1

| | Elongation at Break in % | | | | | |
|---|---|---|---|---|---|---|
| Exposure | Polyurethane according to Example 1 | | Comparison Sample A (not stabilised) | | Comparison Sample B (stabiliser added) | |
| Time | n.extr.* | extr.* | n.extr.* | extr.* | n.extr.* | extr.* |
| 0 hour | 720 | 730 | 660 | 740 | 800 | 700 |
| 25 hours | 720 | 770 | 670 | 500 | 590 | 460 |
| 50 hours | 750 | 830 | 0 | 0 | 670 | 0 |

Table 1-continued

| Exposure Time | Polyurethane according to Example 1 | | Comparison Sample A (not stabilised) | | Comparison Sample B (stabiliser added) | |
|---|---|---|---|---|---|---|
| | n.extr.* | extr.* | n.extr.* | extr.* | n.extr.* | extr.* |
| 100 hours | 540 | 580 | 0 | 0 | 630 | 0 |

Elongation at Break in %

*n.extr. = not extracted, extr. = extracted with methanol for 6 hours.

Table 1a

| Exposure Time | Polyurethane according to Example 1 | | Comparison Sample A (not stabilised) | | Comparison Sample B (stabiliser added) | |
|---|---|---|---|---|---|---|
| | n.extr. | extr. | n.extr. | extr. | n.extr. | extr. |
| 0 hour | 3 | 3 | 4 | 3 | 5 | 3 |
| 35 hours | 4 | 3 | 0 | 0 | 4 | 0 |
| 100 hours | 2 | 2 | 0 | 0 | 2 | 0 |

Tensile Strength in g/tex

It can be seen from the tables that the simple addition of a sterically hindered piperidine derivative in the comparison B only gives satisfactory stabilisation before the extraction, whilst the extracted sample B behaves in the same way as the unstabilised sample A. By contrast, the mechanical properties of the sample modified according to the invention are preserved after the extraction to the same degree as before the extraction.

EXAMPLES 2 TO 4

A polyurethane was prepared as in Example 1 but, in place of 2,2,6,6-tetramethyl-4-hydroxypiperidine, the following piperidine derivatives were used as the stabilising component:

Example 2: 0.804 g (4 mmols) of 1-(2-hydroxyethyl)-2,2,6,6-tetramethyl-4-hydroxypiperidine Example 3: 0.624 g (4 mmols) of 4-amino-2,2,6,6-tetramethylpiperidine Example 4: 0.792 g (4 mmols) of 4-hydroxy-2,3,6-trimethyl-2,6-diethylpiperidine.

The films obtained were again exposed before and after an extraction. The comparison samples A (unstabilised) and B (stabilised by addition), which have been described in Example 1, were also exposed as a comparison. The resulting values of the elongation at break are summarised in Table 2.

Table 2

| | Elongation at Break in % | | | |
|---|---|---|---|---|
| Exposure Time in Hours | | 0 | 35 | 50 | 100 |
| Example 2 | not extracted | 880 | | 570 | |
| | extracted | 920 | | 520 | |
| Example 3 | not extracted | 680 | | 730 | 740 |
| | extracted | 770 | | 740 | 600 |
| Example 4 | not extracted | 780 | | 300 | |
| | extracted | 750 | | 290 | |
| Comparison A (not stabilised) | | 830 | 120 | 0 | |
| Comparison B (addition) | not extracted | 800 | | 670 | 630 |
| | extracted | 700 | 80 | 0 | |

EXAMPLE 5

60 g (30 mmols) of polytetramethylene ether having a molecular weight of 2,000 were dissolved in 200 g of chlorobenzene and freed from residual moisture by distilling off 80 g of chlorobenzene. 22.5 g (90 mmols) of diphenylmethane 4,4'-diisocyanate were dissolved in 22.5 g of tetrahydrofurane and added to the above solution. The mixture was warmed to 120° C and stirred at this temperature for 30 minutes. A solution of 0.996 g (2 mmols) of 3,15-bis(2-hydroxyethyl)-2,2,4,4,14,14,16,16-octamethyl-3,15-diaza-7,11,18,21-tetraoxatrispiro[5.2.2.5.2.2]heneicosane of the formula XIV

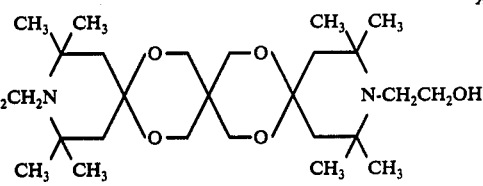

in 5 g of tetrahydrofurane was added to the reaction solution and the latter was stirred at 110° C for a further 90 minutes. Finally, 5.22 g (58 mmols) of butane-1,4-diol, dissolved in 25 g of tetrahydrofurane and 120 g of chlorobenzene were added and the mixture was stirred at 110° C for a further 90 minutes. The cooled reaction solution was added dropwise, whilst stirring vigorously, to 4 l of methanol, the polyurethane precipitating. The polyurethane was filtered off, dried and dissolved in a mixture of equal parts of methyl ethyl ketone and dimethylformamide to give a 20% strength solution. The filtered solution was spread in a layer thickness of 0.5 mm on aluminum foils. The polyurethane films were first dried at room temperature and then at 100° C in vacuo. Some of the films were extracted with methanol at 57° C in a Soxhlet apparatus for 6 hours, and the extracted samples and samples not extracted were exposed in a Xenotest 1200 and tested, at regular intervals, for their elongation and tensile strength.

For comparison, a polyurethane was prepared as described above but without the piperidine derivative of the formula XIV and using 5.4 g (60 mmols) of butanediol. The resulting solution, which can be spread, of the reprecipitated polyurethane was divided into two. One half was processed unchanged to give films (comparison sample C), whilst 0.5 g of the substance of the formula XIV was added, before spreading, to the other half (comparison sample D).

Table 3 shows the elongation values obtained after exposure.

Table 3

| | Elongation at Break in % | | |
|---|---|---|---|
| Exposure Time in Hours | | 0 | 25 |
| Polyurethane according to Example 5 (compound XIV incorporated) | not extracted | 709 | 690 |
| | extracted | 706 | 550 |
| Comparison Sample C (not stabilised) | | 700 | 0 |
| Comparison Sample D (compound XIV added) | not extracted | 706 | 720 |
| | extracted | 730 | 0 |

EXAMPLES 6 to 8

The procedure followed was as in Example 5 except that only 5.04 g (56 mmols) of butane-1,4-diol were used and 4 mmols of the following piperidine derivatives were used in each case as the stabilising component:

Example 6: 0.804 g of 1-(2-hydroxyethyl)-2,2,6,6-tetramethyl-4-hydroxypiperidine Example 7: 0.628 g of 2,2,6,6-tetramethyl-4-hydroxypiperidine Example 8: 0.624 g of 2,2,6,6-tetramethyl-4-aminopiperidine. A further 3 comparison samples were prepared as in comparison C and the same amounts of the same piperidine compounds as in Examples 6 to 8 were added, before spreading, to the solutions of the polyurethane (comparison samples F, G and H).

Table 4 shows the corresponding elongation values of the polyurethane films.

Table 4

| Exposure Time in Hours | | Elongation at Break in % | | | |
|---|---|---|---|---|---|
| | | 0 | 25 | 50 | 150 |
| Polyurethane according to Example 6 | not extracted | 780 | 650 | | 180 |
| (0.9% incorporated) | extracted | 800 | 670 | | 175 |
| Comparison Sample F | not extracted | 770 | 650 | | 263 |
| (0.9% added) | extracted | 670 | 0 | | 0 |
| Polyurethane according to Example 7 | not extracted | 770 | 640 | 540 | |
| (0.7% incorporated) | extracted | 710 | 520 | 480 | |
| Comparison Sample G | not extracted | 705 | 670 | 470 | |
| (0.7% added) | extracted | 703 | 0 | 0 | |
| Polyurethane according to Example 8 | not extracted | 790 | 720 | | 490 |
| (0.7% incorporated) | extracted | 600 | 610 | | 430 |
| Comparison Sample H | not extracted | 760 | 750 | | 400 |
| (0.7% added) | extracted | 800 | 575 | | 0 |
| Comparison Sample C not stabilised | | 700 | 0 | | |

EXAMPLE 9

56 g (30 mmols) of a polyester from adipic acid and neopentyl glycol/hexanediol (molar ratio 35:65), having a hydroxyl number of 60 and a molecular weight of 1,850, were dried in vacuo under nitrogen in a rotary evaporator at a bath temperature of 120° C. 15 g (60 mmols) of diphenylmethane 4,4'-diisocyanate were then added and the mixture was allowed to react for 1 hour under normal pressure at 120° C bath temperature, whilst being rotated. 0.804 g (4 mmols) of 1-(2-hydroxyethyl)-2,2,6,6-tetramethyl-4-hydroxypiperidine was then added and the mixture was allowed to rotate at 120° C for a further hour. Finally, 1.61 g (26 mmols) of ethylene glycol were added and the reaction was allowed to proceed as above for a further hour. After cooling to about 50° C, 150 g of tetrahydrofurane and 150 g of dimethylformamide were added and the mixture was rotated. The resulting viscous solution was spread on aluminium foils in a layer thickness of 0.5 mm. The coatings were dried at room temperature and exposed for 100 hours in a Xenotest 1200. Before and after exposure, the colour of the polyurethane coating was assessed in accordance with the Gardner scale. Some of the films were extracted, before exposure, with methanol at 57° C in a Soxhlet apparatus for 6 hours.

For comparison, a polyester-urethane was prepared as above but without the piperidine derivative and using 1.86 g (30 mmols) of ethylene glycol. One half of the solution ready to be spread was used as such (comparison sample J), and 0.4 of bis-(2,2,6,6-tetramethylpiperidin-4-yl) sebacate was added to the other half before spreading (comparison sample K).

Table 5 which follows shows that the incorporation, according to the invention, of the piperidine derivatives prevents a photochemical discolouration of the polyurethanes, even if the sample has been extracted.

Table 5

| | | Colour Number according to Gardner | |
|---|---|---|---|
| | | Before Exposure | After Exposure |
| Polyurethane according to Example 9 | not extracted | 1 | 2 |
| | extracted | 0 | 1 |
| Comparison Sample J (not stabilised) | not extracted | 1 | 5 |
| | extracted | 0 | 3 |
| Comparison Sample K (addition of stabiliser) | not extracted | 1 | 1 |
| | extracted | 0 | 3 |

EXAMPLE 10

Lacquers were prepared using a polyol masked by oxazolidine and an aliphatic diisocyanate as polyurethane component. The following parent lacquer (solution A) was employed for this purpose.

| Solution A | Parts by weight |
|---|---|
| polyol masked by oxazolidine (experimental resin OR 568 from Rohm & Haas Cie) | 20.33 |
| cellulose acetate butyrate (CAB 551-0.01 from Eastman Chem.Corp.) as 50% solution in solvent LG | 21.83 |
| aluminium pigment (Alcoa 726, Aluminium Corp. of America) | 2.08 |
| phenolic antioxidant (Irganox 1010, Ciba-Geigy AG) | 0.44 |
| levelling agent (Byketol special, Byk-Mallinckrodt) | 2.50 |
| solvent LG | 17.17 |
| | 64.35 |

Solvent LG is a mixture of the following solvents:

| methyl ethyl ketone | 28.5 | parts by weight |
|---|---|---|
| methyl isobutyl ketone | 22.5 | parts by weight |
| toluene | 18.5 | parts by weight |
| ethyl glycol acetate | 16.0 | parts by weight |
| ethyl acetate | 14.5 | parts by weight |
| | 100.0 | |

To produce the lacquer specimens, the solution A was mixed with a solution of the given reactive piperidine derivative (solution C), and immediately before the spraying of the lacquer there was added the hardener solution B composed of the given amount of Desmodur N-75, a polyadduct of hexamethylenediisocyanate (Fa.-Bayer AG), and the solvent mixture LG. The mixtures of A, B and C were sprayed onto cleaned iron plates; the specimens were dried for a short time in air and subsequently for 30 minutes in a drying chamber at 80° C. The following recipes were prepared:

| Specimen I (control) | |
|---|---|
| solution A | 64.35 parts by weight |
| solution B from | 20.65 parts by weight of Desmodur N-75 and |
| | 10.0 parts by weight of solvent LG |
| solution C from | 5.0 parts by weight of solvent G |

| Specimen II | |
|---|---|
| solution A | 64.35 parts by weight |
| solution B from | 20.65 parts by weight of Desmodur N-75 and |
| | 9.34 parts by weight of solvent LG |
| solution C from | 0.44 part by weight of 1,2,2,6,6-pentamethyl-4-aminopiperidine and |
| | 4.56 parts by weight of solvent LG |

| Specimen III | |
|---|---|
| solution A | 64.35 parts by weight, |
| solution B from | 21.8 parts by weight of Desmodur N-75 and |
| | 8.85 parts by weight of solvent LG, |
| solution C from | 0.44 part by weight of 1-hydroxyethyl-4-diethanolamino-2,2,6,6-tetramethyl-piperidine and |
| | 8.85 parts by weight of solvent LG |

| Specimen IV | |
|---|---|
| solution A | 64.35 parts by weight |
| solution B from | 21.22 parts by weight of Desmodur N-75 and |
| | 9.43 parts by weight of solvent LG |
| solution C from | 0.22 part by weight of 1-hydroxyethyl-4-diethanolamino-2,2,6,6-tetramethyl-piperidine and |

| -continued | |
|---|---|
| Specimen IV | |
| | 0.22 part by weight of Tinuvin 328*) and |
| | 4.56 parts by weight of solvent LG |

*light stabiliser based on a benzotriazole derivative of Ciba-Geigy AG

The lacquer specimens were subjected in the Xenotest 1200 to weathering and irradiation. After an exposure time of 500 hours, the loss of lustre was determined according to ASTM D 523 (20°). It was shown that the loss of lustre occurring on the specimens II, III and IV was considerably less than that occurring on the unstabilised specimen I.

What is claimed is:

1. Polyurethanes which are stabilised against light degradation and contain in the polymer molecule the grouping

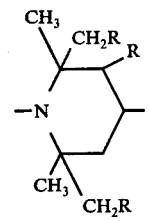

in which R denotes hydrogen or alkyl with 1–5 C atoms.

2. Stabilised polyurethanes according to Claim 1, in the manufacture of which at least one piperidine derivative corresponding to one of the following formulae I to XIII

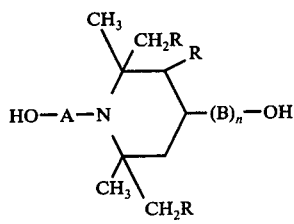    I

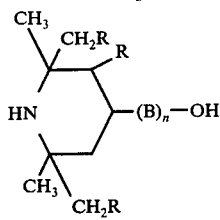    II

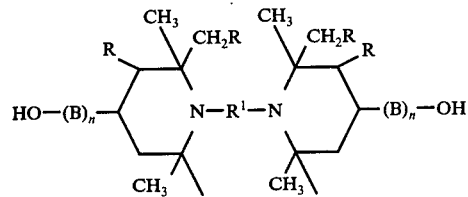    III

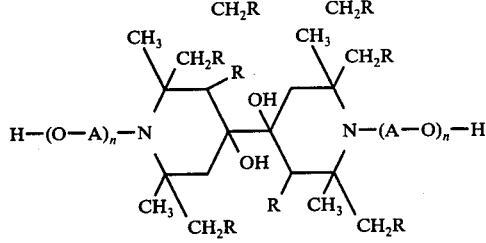    IV

-continued
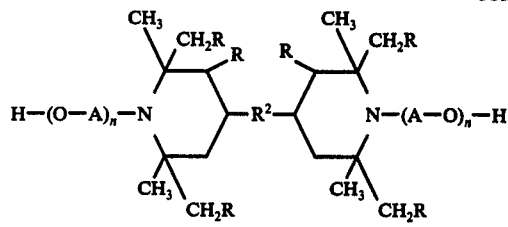 V
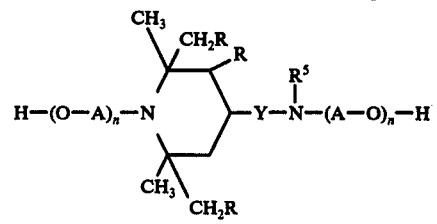 VI
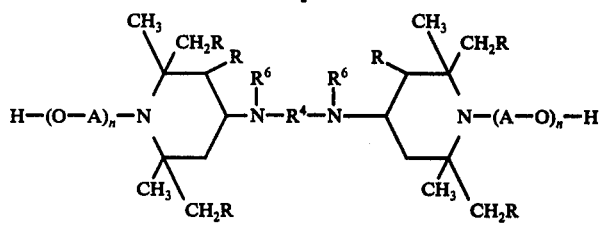 VII
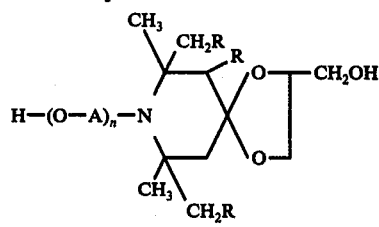 VIII
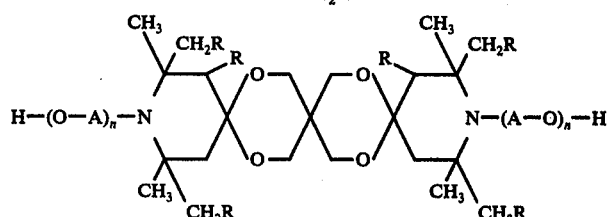 IX
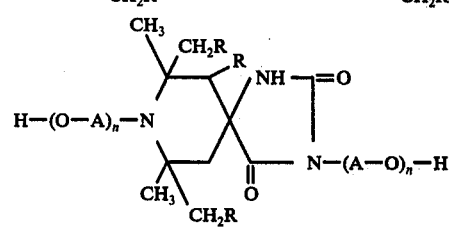 X
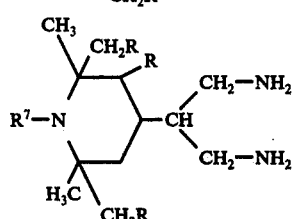 XI
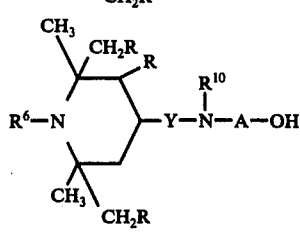 XII

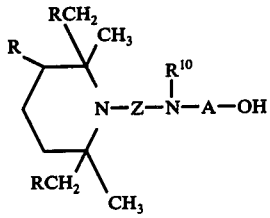

XIII in which A denotes a group —CH$_2$—CH$_2$—, —CH$_2$—CH(CH$_3$)— or —CH$_2$—CH(C$_6$H$_5$)—, B denotes a group —CH$_2$—CH$_2$— and n denotes zero or 1, Y denotes a direct bond, —CH$_2$CH$_2$— or —OCH$_2$CH$_2$CH$_2$—, preferably a direct bond, Z denotes a group —CH$_2$CH$_2$CH$_2$— or —CH$_2$CH$_2$OCH$_2$CH$_2$CH$_2$—, R denotes hydrogen or alkyl with 1 to 5 C atoms, preferably hydrogen or methyl, R$^1$ denotes alkylene with 4 to 10 C atoms, alkenylene with 4 to 8 C atoms, p-xylylene or

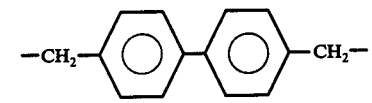

and R$_2$ denotes alkylene with 4-10 C atoms, xylylene,

or one of the groups —NR$^5$—CO—NR$^5$—, NR$^5$—CO—CO—NR$^5$—, NR$^5$—CO—R$^3$—CO—NR$^5$—, -O-alkylene-O- with 1–10 C atoms, -O-alkenylene-O- with 4–8 C atoms, -O-xylylene-O-,

—O(CH$_2$)$_2$NHCONH(CH$_2$)$_3$O—, —O(CH$_2$)$_3$NHCOCONH(CH$_2$)$_3$O—, —O(CH$_2$)$_3$NHCO—R$^3$—CONH(CH$_2$)$_3$O—, —CH$_2$CH$_2$NHCONHCH$_2$CH$_2$—, —CH$_2$CH$_2$NHCOCONHCH$_2$CH$_2$—, —CH$_2$CH$_2$NHCO—R$^3$—CONHCH$_2$CH$_2$— or —O—CO—R$^3$—CO—O—, and R$^3$ denotes alkylene with 1 to 10 C atoms, phenylene or one of the groups

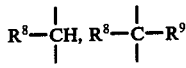

or NH-R$^4$-NH and R$^4$ denotes alkylene with 2 to 12 C atoms, arylene with 6 to 12 C atoms or a radical phenylene-X-phenylene in which X represents —CH$_2$—, >C(CH$_3$)$_2$, —O— or —SO$_2$—, R$^5$ denotes hydrogen, alkyl with 1 to 12 C atoms, aryl or alkaryl with 6 to 10 C atoms, aralkyl with 7 to 9 C atoms or cyclohexyl, R$^6$ denotes hydrogen, alkyl with 1 to 12 C atoms, allyl, benzyl or acyl with 1 to 12 C atoms, R$^7$ denotes hydrogen, alkyl with 1 to 12 C atoms, allyl, benzyl or acyl with 2 to 4 C atoms, R$^8$ denotes allyl, phenyl, benzyl or hydroxy-dialkylbenzyl with 9-15 C atoms, R$^9$ denotes allyl, benzyl or hydroxy-dialkylbenzyl with 9-15 C atoms, and R$^{10}$ denotes hydrogen or the group —A—OH, is used.

3. Stabilised polyurethanes according to claim 2, in the manufacture of which at least one piperidine derivative of one of the formulae I to XIII, in which R is hydrogen or methyl, is used.

4. Stabilised polyurethanes according to claim 3, in which R is hydrogen.

5. Stabilised polyurethanes according to claim 2, in the manufacture of which a piperidine derivative of the formulae I, II or III, in which n denotes zero, is used.

6. Stabilised polyurethanes according to claim 2, in the manufacture of which a piperidine derivative of the formulae VI, XI and XII, in which R$^5$, R$^6$ and R$^7$ denote hydrogen or methyl, is used.

7. Stabilised polyurethanes according to claim 2, in the manufacture of which a piperidine derivative of the formula VI, in which n denotes zero, Y denotes a direct bond and R$^5$ denotes hydrogen, is used.

8. Stabilised polyurethanes according to claim 2, in the manufacture of which one of the following piperidine derivatives:
4-hydroxy-2,2,6,6-tetramethylpiperidine,
4-amino-2,2,6,6-tetramethylpiperidine,
1-(2-hydroxyethyl)-4-hydroxy-2,2,6,6-tetramethylpiperidine,
4-hydroxy-2,3,6-trimethyl-2,6-diethylpiperidine,
3,15-bis-(2-hydroxyethyl)-2,2,4,4,14,14,16,16-octamethyl-3,15-diaza-7,11,18,21-tetraoxatrispiro[5.2.2.5.2.2-]heneicosane, is additionally used.

9. Stabilised polyurethanes according to claim 1, in which the proportion of the active group

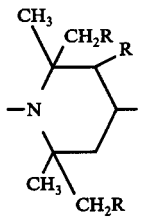

is 0.01 to 5 % by weight of the solvent-free polyurethane.

* * * * *